(12) United States Patent
Nagashima et al.

(10) Patent No.: US 10,279,735 B2
(45) Date of Patent: May 7, 2019

(54) VEHICLE INTERIOR COMPONENT

(71) Applicant: KASAI KOGYO CO., LTD., Kanagawa (JP)

(72) Inventors: Katsuya Nagashima, Hadano (JP); Toshihiko Seki, Kamakura (JP)

(73) Assignee: KASAI KOGYO CO., LTD., Koza-Gun, Kanagawa (JP)

( * ) Notice: Subject to any disclaimer, the term of this patent is extended or adjusted under 35 U.S.C. 154(b) by 0 days.

(21) Appl. No.: 15/546,395

(22) PCT Filed: Mar. 25, 2015

(86) PCT No.: PCT/JP2015/001688
§ 371 (c)(1),
(2) Date: Jul. 26, 2017

(87) PCT Pub. No.: WO2016/151631
PCT Pub. Date: Sep. 29, 2016

(65) Prior Publication Data
US 2018/0022275 A1  Jan. 25, 2018

(51) Int. Cl.
*B60Q 3/20* (2017.01)
*B62D 25/04* (2006.01)
*B60R 13/02* (2006.01)

(52) U.S. Cl.
CPC ............... *B60Q 3/20* (2017.02); *B60R 13/02* (2013.01); *B60R 13/025* (2013.01); *B62D 25/04* (2013.01); *B60R 2013/0287* (2013.01)

(58) Field of Classification Search
CPC ........ B60R 13/025; B62D 25/04; B60Q 3/20; B60Q 3/51; B60Q 3/14; B60Q 1/2619

USPC .......................................... 296/1.08; 362/488
See application file for complete search history.

(56) References Cited

U.S. PATENT DOCUMENTS

| 5,415,554 | A | * | 5/1995 | Kempkers | ............. | B60R 13/025 296/39.1 |
| 6,296,381 | B1 | * | 10/2001 | Sinn | ....................... | B60S 1/0885 362/464 |
| 9,959,767 | B1 | * | 5/2018 | Canella | ..................... | G06F 3/14 |
| 2004/0004541 | A1 | | 1/2004 | Hong | | |
| 2007/0013200 | A1 | * | 1/2007 | Totani | ..................... | B60R 11/02 296/1.07 |
| 2007/0278703 | A1 | * | 12/2007 | Hardy | ................... | B29C 39/006 264/1.37 |

(Continued)

FOREIGN PATENT DOCUMENTS

| EP | 1378395 A1 | 1/2004 |
| JP | H08-216801 A | 8/1996 |

(Continued)

OTHER PUBLICATIONS

International Search Report for International Application No. PCT/JP2015/001688 dated Jun. 16, 2015, Japan, 1 page.

*Primary Examiner* — Jason S Morrow
(74) *Attorney, Agent, or Firm* — United IP Counselors, LLC

(57) ABSTRACT

A vehicle interior component includes an interior component body arranged along a vehicle body member with a face thereof exposed to a vehicle room and a display unit arranged at the interior component body to perform displaying for a passenger. The display unit is arranged at a range extending from a rear-side face section of the interior component body to an inner-side face section thereof.

2 Claims, 5 Drawing Sheets

(56) References Cited

U.S. PATENT DOCUMENTS

| | | | |
|---|---|---|---|
| 2011/0057465 A1* | 3/2011 | Beau | B60K 37/00 296/1.08 |
| 2012/0074725 A1* | 3/2012 | Jeon | B60R 13/02 296/1.08 |
| 2015/0084756 A1* | 3/2015 | Mori | B60R 13/02 340/435 |
| 2015/0165964 A1* | 6/2015 | Mori | B60Q 9/00 362/548 |
| 2017/0139506 A1* | 5/2017 | Rodriguez | B29C 45/14688 |
| 2018/0072156 A1* | 3/2018 | Tae | B60K 35/00 |

FOREIGN PATENT DOCUMENTS

| | | |
|---|---|---|
| JP | H11-042989 A | 2/1999 |
| JP | 2001-246996 A | 9/2001 |
| JP | 2004-034957 A | 2/2004 |
| JP | 2008-065551 A | 3/2008 |
| JP | 2009-126214 A | 6/2009 |
| JP | 2013-161257 A | 8/2013 |
| KR | 10-2004-0003216 A | 1/2004 |

* cited by examiner

VEHICLE INTERIOR COMPONENT

CROSS-REFERENCE TO RELATED APPLICATIONS

This application is a National Stage Entry application of PCT International Application No. PCT/JP2015/001688, filed on Mar. 25, 2015, the entire contents of which are hereby incorporated by reference.

BACKGROUND

1. Technical Field

The present invention relates to a vehicle interior component, and in particular, relates to a vehicle interior component having a displaying function for drawing attention of a passenger (typically, a driver) as being arranged at a vehicle body member in front of a driver's seat.

2. Description of the Background

Conventionally, there has been known a vehicle interior component for shaping and finishing of vehicle interior. Such an interior component is arranged along a vehicle body member in a manner such that a face thereof is exposed to a vehicle room.

For example, Japanese Patent Application Laid-open No. H11-42989 (hereinafter referred to as "Patent Literature 1"), Japanese Patent Application Laid-open No. 2008-65551 (hereinafter referred to as "Patent Literature 2"), or Japanese Patent Application Laid-open No. 2013-161257 (hereinafter referred to as "Patent Literature 3") discloses technologies to draw attention of a passenger using a display unit that is arranged at a vehicle interior component. Patent Literature 1 discloses a configuration that an alarm indicator for indicating a large risk to an adjacent lane is arranged at each of right-left front pillars. Patent Literature 2 discloses a configuration that an LED for informing to a passenger is arranged at each of right-left front pillars. Similarly, Patent Literature 3 discloses a configuration that a light emitting section for alarming of an approaching object approaching from a lateral rear side is arranged at each of right-left front pillars.

BRIEF SUMMARY

For appropriately drawing attention of a passenger, excellent visibility is required for a display unit. When ambient light represented by sunlight enters to a vehicle room and strong light such as direct sunlight is radiated to a display unit, there arises a problem that the displayed contents become difficult to be recognized.

In view of the above, an object of the present invention is to provide a vehicle interior component capable of displaying with excellent visibility for a passenger.

To achieve the abovementioned object, the present invention provides a vehicle interior component arranged at a vehicle body member in front of a driver's seat. The vehicle interior component includes an interior component body arranged along the vehicle body member with a face thereof exposed to a vehicle room, and a display unit configured to perform displaying for a passenger as being arranged at the interior component body. The interior component body includes a rear-side face section faced to a rear side in a vehicle front-rear direction and an inner-side face section faced to an inner side in a vehicle width direction as being connected to the rear-side face section through a curved section. The display unit is arranged at a range extending from the rear-side face section to the inner-side face section.

In the present invention, it is preferable that the display unit includes a light source configured to radiate light to the interior component body from a back face side thereof, and a transmissive section configured to perform displaying to be visible from a front face side of the interior component body by being transmissively illuminated with light from the light source as being arranged at a part of the interior component body.

Further, in the present invention, it is preferable that the transmissive section is formed by thinning a region of the interior component body.

Further, in the present invention, it is preferable that the vehicle body member is a front pillar, and the display unit is arranged at a predetermined range on a lower side of the interior component body in a vehicle top-bottom direction.

According to the present invention, since a part or whole of the display unit is visible without being influenced by ambient light, it is possible to perform displaying with excellent visibility for a passenger.

DETAILED DESCRIPTION

First Embodiment

Figure 1:
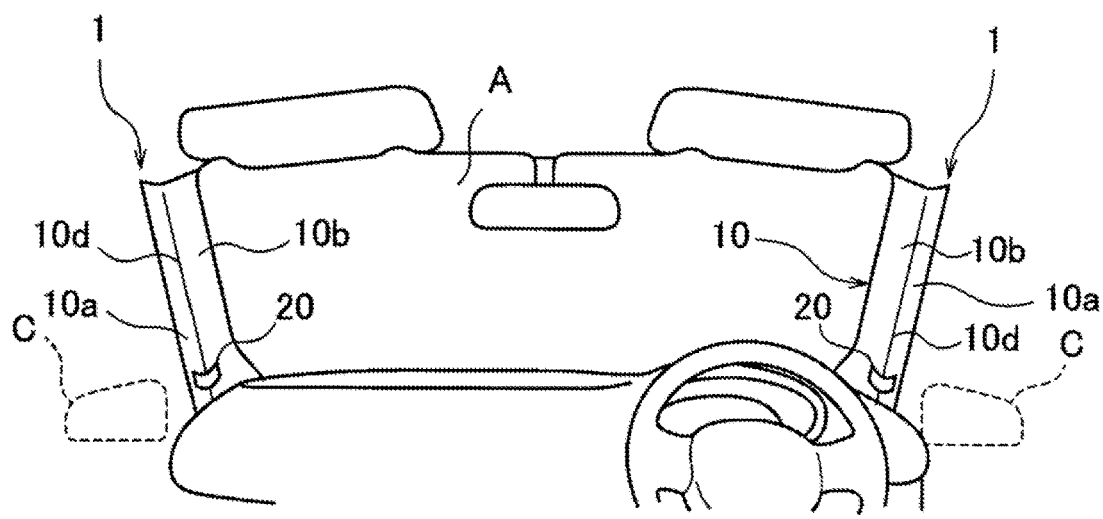
FIG. 1 is an explanatory view illustrating a structure of a first embodiment at a vehicle interior in front of a driver's seat.
Figure 2:
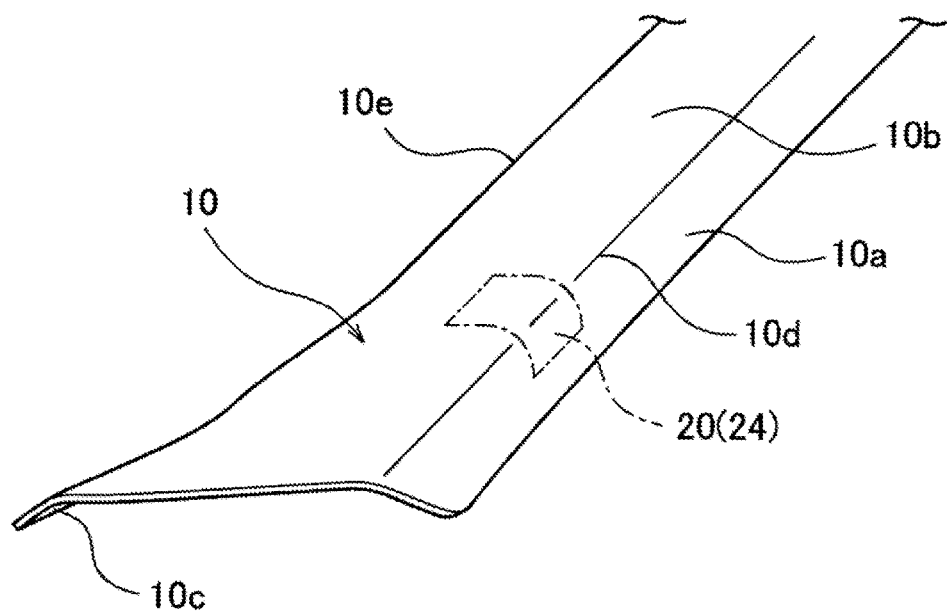
FIG. 2 is an enlarged explanatory view illustrating a main part of a front pillar trim of the first embodiment.
Figure 3:
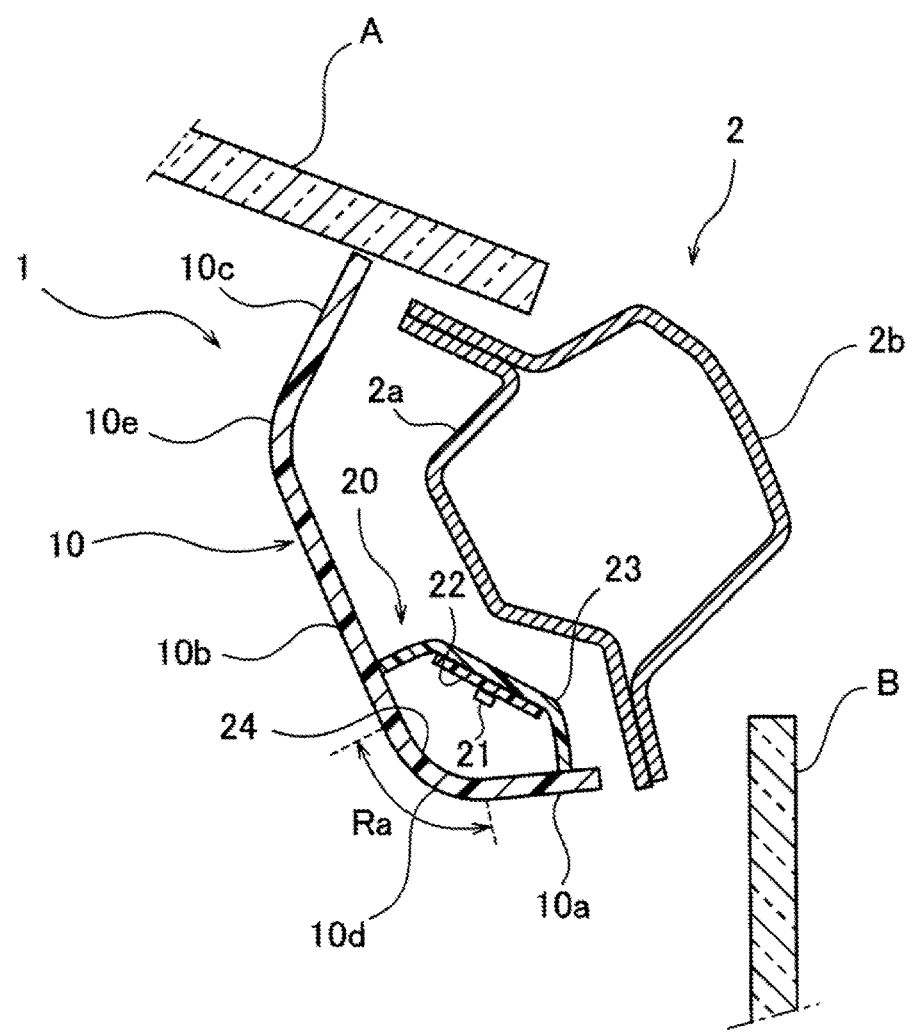
FIG. 3 is an explanatory cross-sectional view schematically illustrating a vehicle main part including the front pillar trim of the first embodiment.

In the following, detailed description will be provided on a vehicle interior component of a first embodiment. The vehicle interior component of the present embodiment is a front pillar trim 1 arranged at a front pillar (A pillar) 2 in front of a driver's seat. The front pillar trim 1 has a displaying function for drawing attention of a passenger (e.g., a driver). FIG. 1 is an explanatory view illustrating a structure of a vehicle interior in front of a driver's seat. FIG. 2 is an enlarged explanatory view illustrating a main part of the front pillar trim 1. FIG. 3 is an explanatory cross-sectional view schematically illustrating a vehicle main part including the front pillar trim 1.

The front pillar 2 is a metal-made vehicle frame member (vehicle body member). The front pillar 2 is arranged at a front edge, in a vehicle front-rear direction, of a side door opening formed on each side of a vehicle body approximately along a vehicle top-bottom direction. The front pillar 2 includes a pillar inner panel 2a and a pillar outer panel 2b to form a polygonal-tube shape. The pillar inner panel 2a is arranged on the inner side in a vehicle width direction as serving as an inner plate of the front pillar 2. The pillar outer panel 2b is arranged on the outer side of the pillar inner panel 2a in the vehicle width direction as serving as an outer plate of the front pillar 2. A front window glass A is located on a front side of the front pillar 2 in the vehicle front-rear direction and a side window glass B arranged at a front side door is located on a rear side of the front pillar 2.

The front pillar trim 1 is arranged along the front pillar 2 with a face thereof exposed to a vehicle room. The front pillar trim 1 includes a trim body 10 being an interior component body and a display unit 20.

The trim body 10 is a plate-shaped member, a cross-section of which is curved to be approximately U-shaped. The trim body 10 is formed by mold-injecting synthetic resin such as polypropylene (PP). The trim body 10 is arranged such that a curved outer face (front face) having a convex outline is exposed to the vehicle room and a curved inner face (back face) having a concave outline is faced to the front pillar 2. An attachment clip (not illustrated) is arranged at a predetermined position on the back face of the trim body 10. Owing to that the attachment clip is engaged with an engaging portion of the front pillar 2, the trim body 10 is supported by the front pillar 2.

The trim body 10 is formed mainly with three face sections (i.e., first, second, and third face sections 10a, 10b, 10c) being elongated faces along a longitudinal direction of the front pillar 2. Curved sections 10d, 10e each having a predetermined curvature are formed between the face sections 10a, 10b and between the face sections 10b, 10c, respectively. The three face sections 10a, 10b, 10c are integrated through the curved sections 10d, 10e. Here, the first and second face sections 10a, 10b are connected through the curved section 10d, and the second and third face sections 10b, 10c are connected through the curved section 10e.

In the state that the trim body 10 is arranged along the front pillar 2, the first face section (hereinafter, called a rear-side face section) 10a is faced to the rear side in the vehicle front-rear direction, the second face section (hereinafter, called an inner-side face section) 10b is faced to the inner side in the vehicle width direction, and the third face section (hereinafter, called a front-side face section) 10c is faced to the front side in the vehicle front-rear direction. Thus, the three face sections 10a, 10b, 10c are arranged so that orientations thereof are different from one another. The orientations of the face sections 10a, 10b, 10c are relative thereamong. That is, each of the face sections 10a, 10b, 10c is faced mainly as described above not being only intended to be directly faced.

The display unit 20 is arranged at the trim body 10 to perform displaying for a passenger. The display unit 20 of the present embodiment performs displaying to be visible from the front face side of the trim body 10 owing to that a part of the trim body 10 is transmissively illuminated from the back face side thereof. The display unit 20 mainly includes a light source 21, a cover 23, and a transmissive section 24.

The light source 21 radiates light to the trim body 10 from the back face side thereof. The light source 21 may be an LED, for example. The light source 21 is mounted on a print substrate 22 and ON/OFF thereof is switched in accordance with a drive signal of a controller (not illustrated). The print substrate 22 is arranged at a specific position inside the cover 23 so that the light axis center of the light source 21 is oriented in a direction toward the driver's seat.

The cover 23 houses the print substrate 22 and introduces light emitted from the light source 21 thoroughly to the transmissive section 24. The cover 23 has a conical bowl-shape and is in contact with the trim body 10 on the back face side to cover the transmissive section 24. An opening of the cover 23 is formed to be matched with an outer edge shape of the transmissive section 24. Here, owing to that an inner face of the cover 23 is formed as a reflective face, the cover 23 may also serve as a reflector to reflect light from the light source 21 toward the opening.

The transmissive section 24 is arranged at a part of the trim body 10 and performs displaying to be visible from the front face side of the trim body 10 by being transmissively illuminated with light from the light source 21. The transmissive section 24 is defined as a region covered with the cover 23.

As one of features of the present embodiment, the transmissive section 24 is arranged at a predetermined range of the trim body 10, specifically, a range extending from the rear-side face section 10a to an inner-side face section 10b. In other words, the transmissive section 24 is arranged at a range extending from a curved region Ra of the curved section 10d to each of the rear-side face section 10a and the inner-side face section 10b by a given length including the curved region Ra.

The ranges of the transmissive section 24 extending to the respective face sections 10a, 10b are determined in consideration of a size of the curved region Ra of the curved section 10d, visibility of displaying as a whole through the transmissive section 24, and the like. For example, the range of the transmissive section 24 may extend to 5 mm or longer. Thus, it is possible to ensure certain size of a display range (range through which transmitted light can be recognized) on the respective face sections 10a, 10b.

Further, the transmissive section 24 is arranged at a predetermined range on a lower side, in the vehicle top-bottom direction, of the trim body 10 attached to the front pillar 2. For example, the transmissive section 24 is arranged at a range within 200 mm from a lower end of the trim body 10.

A bag body of a curtain air-bag system to protect a passenger against a collision on a side of a vehicle is arranged in a predetermined region on an upper side of the trim body 10 between the trim body 10 and the front pillar 2. The trim body 10 is configured to be broken when the bag body is expanded. Accordingly, the transmissive section 24 (display unit 20) is required to avoid interference with the bag body. Further, owing to that the transmissive section 24 (display unit 20) is arranged on the lower side of the trim body 10, location of the display unit 20 can be matched with a sight trajectory of a driver from the front toward a door mirror C. Thus, the display unit 20 is located on the sight trajectory toward the door mirror C.

According to the front pillar trim 1 described above, when the light source 21 is turned on, the transmissive section 24 is illuminated from the back face side of the trim body 10. Light radiated to the transmissive section 24 is transmitted through the transmissive section 24 and the transmitted light is to be visible from the front face side of the trim body 10. Thus, the transmitted light can cause driver's attention to be drawn. For example, in a case that another vehicle approaches to a lateral rear side, displaying is performed at the display unit 20 of the front pillar trim 1 on the side corresponding to the vehicle. Thus, it is possible to draw attention for vehicle approaching as well as the direction such as a right rear side and a left rear side.

As described above, in the present embodiment, the display unit 20, that is, the display range (the range where transmitted light is visible through the transmissive section 24) of the display unit 20, is arranged at the range extending from the rear-side face section 10a to the inner-side face section 10b.

According to extension of the display unit 20 on the two face sections 10a, 10b, since area of the display unit 20 can be widely ensured, visibility thereof can be improved. In particular, visibility of the rear-side face section 10a faced rearward in the vehicle front-rear direction and the inner-side face section 10b faced inward in the vehicle width direction are excellent in visibility from a driver's seat located at an obliquely rear side from the front pillar 2. Thus, visibility of the display unit 20 can be enhanced.

The respective face sections 10a, 10b, 10c of the trim body 10 are formed to be oriented in different directions from one another with each front face being faced outward. Accordingly, even in a case that ambient light enters to a vehicle room, ambient light is less likely to be radiated concurrently to the two face sections 10a, 10b where the display unit 20 is located.

Consideration on ambient light entering through the front window glass A and the side window glass B is needed for the front pillar 2. There may be a variety of incident orientations of ambient light. Here, even in a case that ambient light enters toward the rear-side face section 10a, the ambient light passes along a direction of tangent of the curved section 10d at a maximum to be less likely to reach the inner-side face section 10b that is located at a far side via the curved section 10d. Meanwhile, even in a case that ambient light enters toward the inner-side face section 10b, the ambient light passes along the direction of tangent of the curved section 10d at a maximum to be less likely to reach the rear-side face section 10a that is located at a far side via the curved section 10d.

Thus, even in a case that ambient light is radiated to the front pillar trim 1, influence of the ambient light is relieved on at least one of either of the face sections 10a, 10b. Accordingly, the regions of the display unit 20 extending to the respective face sections 10a, 10b are less likely to be influenced by the ambient light. Therefore, it is possible to suppress occurrence of visibility reduction due to illumination of ambient light on the entire display unit 20. That is, according to the display unit 20 of the present embodiment, since a part or whole of the display unit 20 is visible without being influenced by ambient light, it is possible to perform displaying with excellent visibility for a passenger.

As described above, in the present embodiment, the display unit 20 includes the light source 21 that radiates light to the trim body 10 from the back face side thereof and the transmissive section 24 that performs displaying to be visible from the front face side of the trim body 10 by being transmissively illuminated with light from the light source 21 as being arranged at a part of the trim body 10.

According to the above, since displaying is performed with transmissive illumination, the display unit 20 becomes visible on the trim body 10 only when the light source is kept on. In contrast, the display unit 20 does not appear on the trim body 10 when the light source 21 is kept off. Thus, necessary displaying can be appropriately performed while suppressing appearance deterioration due to exposure of the display unit 20 to the vehicle room.

Further, in the present embodiment, the display unit 20 is arranged at a predetermined range on a lower side of the trim body 10 in the vehicle top-bottom direction.

When the display unit 20 is arranged on an upper side of the trim body 10 in the vehicle top-bottom direction, displaying may seem bothersome for a driver owing to that the display unit 20 becomes closer to the driver with arrangement thereof to the upper side. Further, there arises a possibility of interference with a bag body of a curtain air-bag system housed in the trim body 10. However, in the present embodiment, since displaying is performed at a position being appropriately apart from a driver, it is less bothersome and interference with a bag body of a curtain air-bag system can be avoided. Further, since the display unit 20 is located on the sight trajectory toward the door mirror C, the display unit 20 can be recognized with natural motion of a sight line for confirming the safety while visibility of the display unit 20 is enhanced.

Second Embodiment

Figure 4:
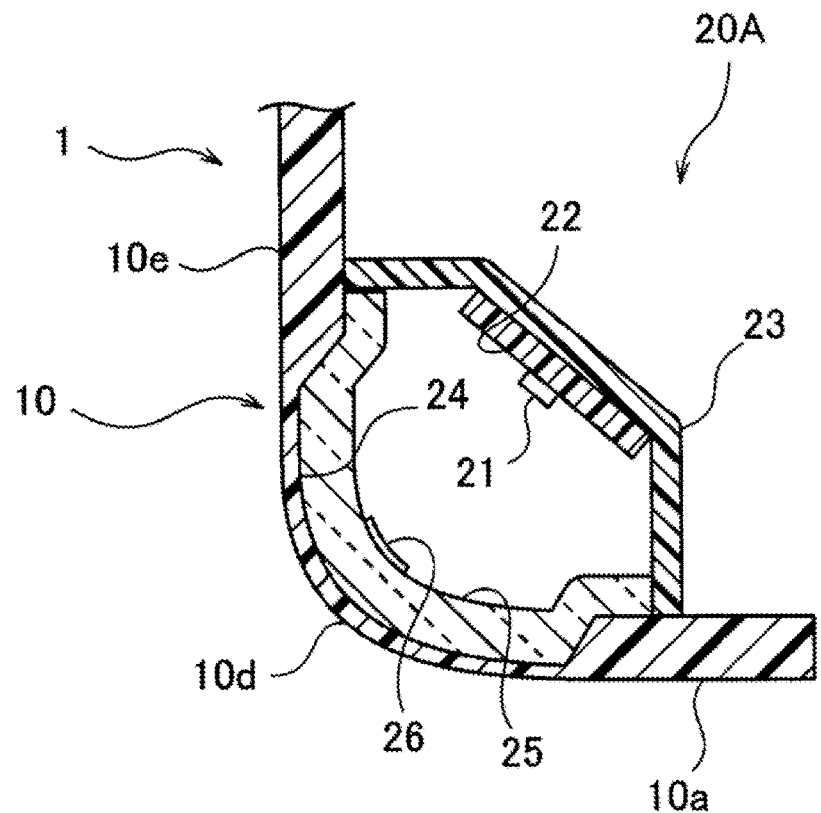
FIG. 4 is an explanatory cross-sectional view schematically illustrating a vehicle main part including a front pillar trim of a second embodiment.

In the following, description will be provided on a front pillar trim 1 of a second embodiment. FIG. 4 is an explanatory cross-sectional view schematically illustrating a vehicle main part including the front pillar trim 1 of the second embodiment. In the following, description will be provided mainly on differences from the first embodiment and redundant description will be skipped.

The front pillar trim 1 of the present embodiment includes a trim body 10 and a display unit 20A. Although the configuration of the trim body 10 is similar to that of the first embodiment, the present embodiment is preferably adopted for the trim body 10 having a low light transmissivity, for example, having a larger thickness than that in the first embodiment.

The display unit 20A is arranged at the trim body 10 to perform displaying for a passenger. Similarly to the first embodiment, the display unit 20A performs displaying to be visible from the front face side of the trim body 10 owing to that a part of the trim body 10 is transmissively illuminated from the back face side thereof. The display unit 20A mainly includes a light source 21, a cover 23, a transmissive section 24, and a reinforcing member 25 as being different from the first embodiment in configuration of the transmissive section 24 and in including the reinforcing member 25.

The transmissive section 24 is arranged at a part of the trim body 10 and performs displaying to be visible from the front face side of the trim body 10 by being transmissively illuminated with light from the light source 21. Similarly to the first embodiment, the transmissive section 24 is arranged at a range extending from the rear-side face section 10a to the inner-side face section 10b.

As a feature of the present embodiment, the transmissive section 24 is formed into a thin shape to have a relatively small thickness of the trim body 10 for enhancing light transmissivity. That is, the transmissive section 24 is formed by thinning a specific region of the trim body 10.

Here, when being thinned, the transmissive section 24 decreases in strength. Therefore, the reinforcing member 25 being a transparent plate-like member for reinforcing the transmissive section 24 is arranged at the back face side of the trim body 10 corresponding to the transmissive section 24. The reinforcing member 25 is formed into a curved shape to be intimately contacted to the back face side of the trim body 10 corresponding to the transmissive section 24 by mold-injecting translucent resin such as polycarbonate.

In view of ensuring strength of the trim body 10, it is preferable that the reinforcing member 25 has a thickness corresponding to the eliminated thickness. However, it is not limited thereto as long as certain strength can be ensured.

A logo section 26 is arranged on a curved inner face (back face) of the reinforcing member 25. The logo section 26 is arranged as corresponding to a center area of light emitted from the light source 21 (an area including the light axis center and peripheries thereof). In the example illustrated in FIG. 4, the logo section 26 is arranged at the curved section 10d existing between the rear-side face section 10a and the inner-side face section 10b.

The logo section 26 causes certain information to be visible from the front face side of the trim body 10 due to contrast or color of light by regulating light transmission or light color transmission through the transmissive section 24. The logo section 26 is formed of a resin film having lower transmissivity than the trim body 10 or a transmissive film for specific color and is stuck to the reinforcing member 25. Alternatively, the logo section 26 may be formed by painting, printing, or the like.

Figure 5A:
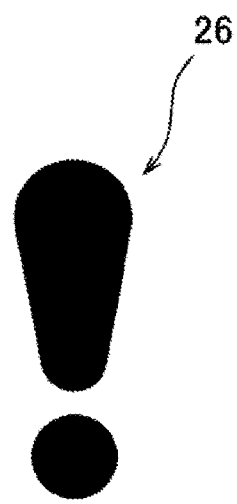
FIGS. 5A and 5B are explanatory views each exemplifying a design of the logo section.
Figure 5B:

The logo section 26 contains information to draw attention of a driver as being formed by stylizing characters, marks, figures, or certain contents. FIGS. 5A and 5B are explanatory views each exemplifying a design of the logo section 26. FIG. 5A illustrates the logo section 26 showing an exclamation mark and FIG. 5B illustrates the logo section 26 that stylizes approaching of another vehicle from a lateral rear side.

As described above, in the present embodiment, the transmissive section 24 is formed by thinning a specific region of the trim body 10 and performs displaying to be visible from the front face side of the trim body 10 with transmissive illumination using light from the light source 21. Further, the display unit 20A includes the reinforcing member 25 arranged on the back face side of the trim body 10 for reinforcing the transmissive section 24.

According to the above, it is possible to ensure strength at the transmissive section 24, that is, the thinned region of the trim body 10. Accordingly, desired displaying can be performed with transmissive illumination while suppressing inconvenience such as damage, breakage, and deformation of the trim body 10.

Further, in the present embodiment, the display unit 20A further includes the logo section 26 that causes certain information to be visible from the front face side of the trim body 10 due to contrast or color of light as being arranged at the reinforcing member 25.

According to the above, it is possible to cause certain information to be visible for a passenger due to contrast or color of light transmitted through the logo section 26 as well as light illumination. Accordingly, attention of a passenger can be drawn more recognizably.

Figure 6:
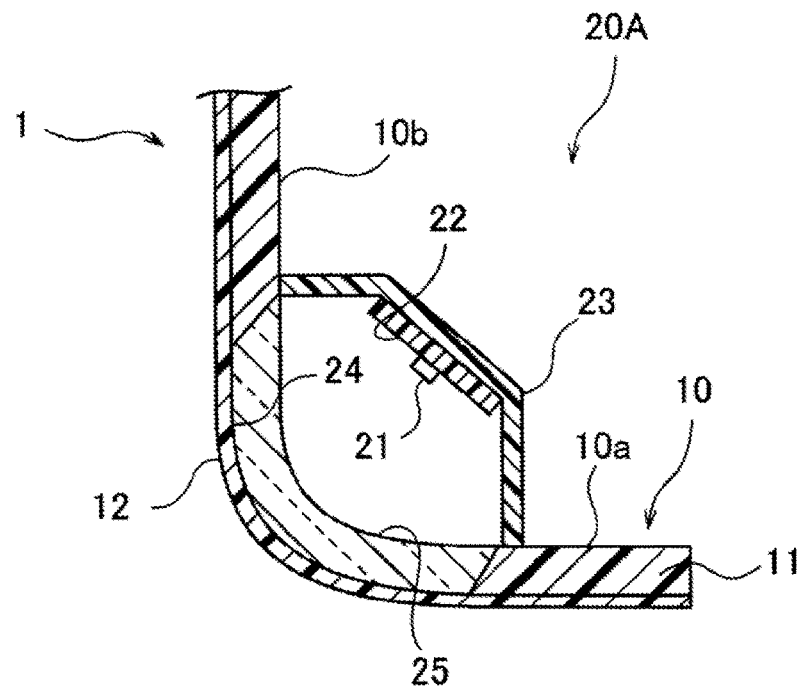
FIG. 6 is an explanatory cross-sectional view schematically illustrating a vehicle main part including a front pillar trim having a different structure of the second embodiment.

In the present embodiment, transmissivity of the transmissive section 24 is enhanced by thinning the trim body 10. Here, as illustrated in FIG. 6, there may be a case that the trim body 10 is formed of a core member 11 being a main portion of the trim body 10 and a surface member 12 such as a cloth member stuck on the front face of the core member 11. In such a case, thinning corresponding to the transmissive section 24 may be performed by forming an opening at a region of the core member 11 corresponding to the transmissive section 24 and causing only the surface member 12 to remain. According to such a configuration, it is possible to form the transmissive section 24 with a region of the trim body 10 thinned.

In the present embodiment, the logo section 26 is arranged on the back face side of the reinforcing member 25. However, the logo section 26 may be arranged on the curved outer face (front face) of the reinforcing member 25.

Third Embodiment

Figure 7:
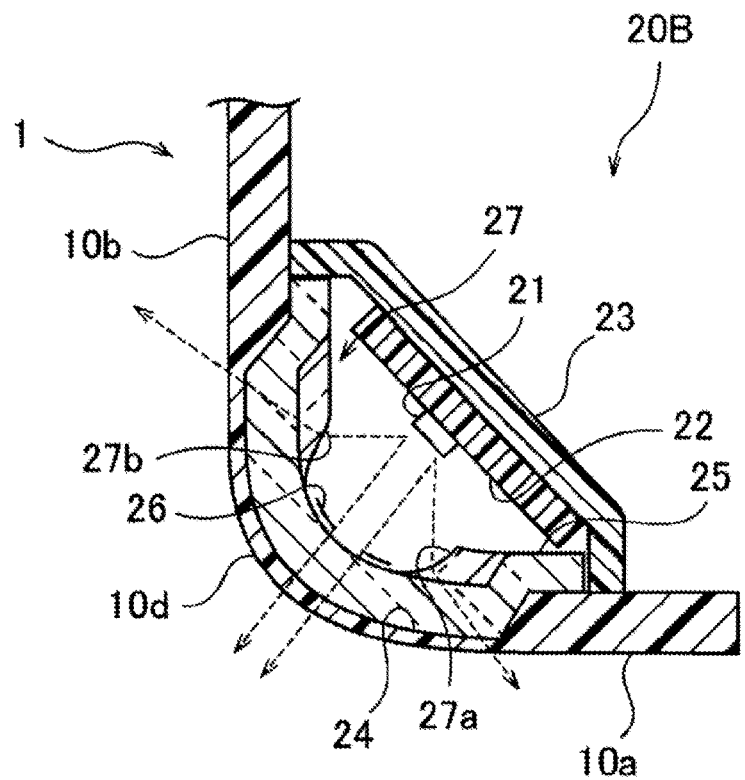
FIG. 7 is an explanatory cross-sectional view schematically illustrating a vehicle main part including a front pillar trim of a third embodiment.

In the following, description will be provided on a front pillar trim 1 of a third embodiment. FIG. 7 is an explanatory cross-sectional view schematically illustrating a vehicle main part including the front pillar trim 1 of the third embodiment. In the following, description will be provided mainly on differences from the second embodiment and redundant description will be skipped.

The front pillar trim 1 of the present embodiment includes a trim body 10 and a display unit 20B. Here, the configuration of the trim body 10 is the same as that of the second embodiment.

The display unit 20B is arranged at the trim body 10 to perform displaying for a passenger. Similarly to the first embodiment, the display unit 20B performs displaying to be visible from the front face side of the trim body 10 owing to that a part of the trim body 10 is transmissively illuminated. The display unit 20B mainly includes a light source 21, a cover 23, a transmissive section 24, a reinforcing member 25, and a lens member 27 as being different from the second embodiment in including the lens member 27.

The lens member 27 is an optical member to control light from the light source 21 as being arranged on the back face side of the reinforcing member 25. The lens member 27 is formed into a certain shape to be capable of obtaining a below-described optical function by mold-injecting translucent resin such as polycarbonate. Here, it is preferable that the lens member 27 is formed integrally with the reinforcing member 25. In this case, light controlling can be performed without increasing parts count. Of course, the lens member 27 may be formed separately from the reinforcing member 25.

The lens member 27 is arranged in the vicinity of each end of the reinforcing member 25 to control light around the center area of light emitted from the light source 21. Specifically, the lens member 27 includes a first diffusing section 27a arranged in the vicinity of the rear-side face section 10a and a second diffusing section 27b arranged in the vicinity of the inner-side face section 10b.

The respective diffusing sections 27a, 27b are arranged symmetrically about the light axis center of the light source 21 as having a function to cause light incident on an incidence face to diffuse outward. According to the diffusing sections 27a, 27b, light from the light source 21 is further diffused to reach even to edges of the transmissive section 24.

The lens member 27 having such a light diffusing function is not arranged at the center area of light emitted from the light source 21 (the area including the light axis center and peripheries thereof). According to the above, light emitted from the light source 21 is radiated as it is to an area including the logo section 26 without being diffused. As a result, light close to being in a light-collected state is radiated to the logo section 26, so that an image of the logo section 26 is clearly displayed.

As described above, in the present embodiment, the display unit 20B includes the lens member 27 being an optical member to control light from the light source 21 as being arranged on the light path from the light source 21 toward the transmissive section 24. Here, the lens member 27 includes the diffusing sections 27a, 27b that diffuse light around the center area out of light emitted from the light source 21 to be matched with the size of the transmissive section 24.

According to the above, it is possible to control light from the light source 21 with the lens member 27. In particular, according to the diffusing sections 27a, 27b of the lens member 27, light around the center area of light emitted from the light source 21 is diffused outward and radiated to an enlarged range. Accordingly, even in a case that the transmissive section 24 is larger than a radiation range of the light source 21, the entire transmissive section 24 can be appropriately illuminated without causing cost increase as adding another light source 21.

Further, since light at the center area out of light from the light source 21 is not influenced by the diffusing sections 27a, 27b, the area including the logo section 26 can be illuminated with light in a collected state. Accordingly, the logo section 26 can be displayed in a clear state, so that a passenger can be appropriately informed of displayed contents.

Fourth Embodiment

Figure 8:
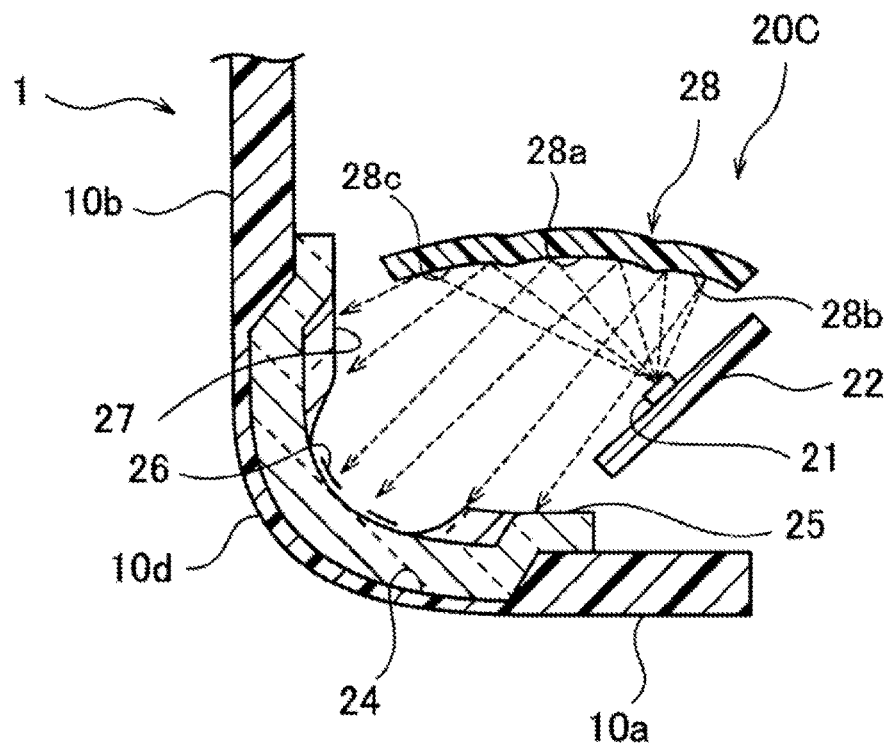
FIG. 8 is an explanatory cross-sectional view schematically illustrating a vehicle main part including a front pillar trim of a fourth embodiment.

In the following, description will be provided on a front pillar trim 1 of a fourth embodiment. FIG. 8 is an explanatory cross-sectional view schematically illustrating a vehicle main part including the front pillar trim 1 of the fourth embodiment. In the following, description will be provided mainly on differences from the third embodiment and redundant description will be skipped.

The front pillar trim 1 of the present embodiment includes a trim body 10 and a display unit 20C. Here, the configuration of the trim body 10 is the same as the third embodiment.

The display unit 20C is arranged at the trim body 10 to perform displaying for a passenger. Similarly to the first embodiment, the display unit 20C performs displaying to be visible from the front face side of the trim body 10 owing to that a transmissive section 24 arranged at a part of the trim body 10 is transmissively illuminated with light from a light source 21. The display unit 20C mainly includes the light source 21, a cover 23, the transmissive section 24, a lens member 27, and a reflecting member 28 as being different from the third embodiment in arrangement of the light source 21 and in including the reflecting member 28.

The light source 21 radiates light to the trim body 10 from the back face side thereof. In the present embodiment, light is radiated to the transmissive section 24 after being reflected by the reflecting member 28.

The reflecting member 28 reflects light radiated from the light source 21 toward the transmissive section 24. The reflecting member 28 has a reflecting face formed into a desired shape by evaporating a film of metal such as aluminum onto a resin substrate to be capable of obtaining a below-described optical function.

The reflecting member 28 includes a light collecting section 28a and a pair of diffusing sections 28b, 28c arranged on both sides of the light collecting section 28a.

The light collecting section 28a has a reflecting face that collects light from the light source 21 and introduces the light toward the transmissive section 24. The light reflected by the light collecting section 28a is radiated to a range including the logo section 26 and peripheries thereof, and then, light transmitted through the transmissive section 24 is introduced in a direction toward a driver's seat.

Each of the diffusing sections 28b, 28c has a reflecting face that diffuses light from the light source 21 outward and introduces the light toward the transmissive section 24. According to the diffusing sections 28b, 28c, light from the light source 21 is further diffused to reach even to edges of the transmissive section 24.

As described above, in the present embodiment, the display unit 20C includes the reflecting member 28 being an optical member to control light from the light source 21 as being arranged on the light path from the light source 21 toward the transmissive section 24. Here, the reflecting member 28 includes the light collecting section 28a that collects light at the center area out of light emitted from the light source 21, and the diffusing sections 28b, 28c that diffuse light around the center area out of light emitted from the light source 21 to be matched with the size of the transmissive section 24.

According to the present embodiment, it is possible to control light from the light source 21 with the reflecting member 28. In particular, according to the diffusing sections 28b, 28c, light around the center area of light emitted from the light source 21 is diffused outward and radiated to an enlarged range. Accordingly, even in a case that the transmissive section 24 is larger than a radiation range of the light source 21, the entire transmissive section 24 can be appropriately illuminated without causing cost increase as adding another light source 21.

Further, since the light collecting section 28a is capable of collecting light, the area including the logo section 26 can be illuminated with light in a collected state. Accordingly, the logo section 26 can be displayed in a clear state, so that a passenger can be appropriately informed of displayed contents.

Further, according to the present embodiment, arrangement flexibility of the light source 21 and the transmissive section 24 is increased by using the reflecting member 28. Accordingly, the display unit 20C can be freely arranged in accordance with a shape of accommodation space with respect to the pillar inner panel 2a so as to be capable of being mounted on various kinds of vehicles.

Here, both the lens member 27 and the reflecting member 28 are arranged in the present embodiment. However, when desired optical characteristics can be provided to the reflecting member 28, the lens member 27 can be eliminated.

In the above, description has been provided on vehicle interior component of the embodiments of the present invention. Naturally, not limited to the embodiments described above, the present invention may be modified variously within the scope of the present invention. For example, although the interior component body has a three-face structure having the rear-side face section, the inner-side face section, and the front-side face section, it is also possible to adopt a two-face structure having a rear-side face section and an inner-side face section.

REFERENCE SIGNS LIST

1: Front pillar trim
2: Front pillar
10: Trim body
10a: Rear-side face section
10b: Inner-side face section
10c: Front-side face section
10d: Curved section
10e: Curved section
20, 20A, 20B, 20C: Display unit
21: Light source
24: Transmissive section
25: Reinforcing member 26: Logo section
27: Lens member
27a: Diffusing section
27b: Diffusing section
28: Reflecting member
28a: Light collecting section
28b: Diffusing section
28c: Diffusing section

The invention claimed is:

1. A vehicle interior component arranged at a vehicle body member in front of a driver's seat, comprising:
   an interior component body arranged along the vehicle body member with a face thereof exposed to a vehicle room, the interior component body including,
      a rear-side face section faced to a rear side in a vehicle front-rear direction,
      an inner-side face section faced to an inner side in a vehicle width direction, and
      a curved section connected to the rear-side face section and the inner-side face section; and
   a display unit including,
      a light source configured to radiate light to the interior component body from a back face side thereof, and
      a transmissive section configured to perform displaying to be visible from a front face side of the interior component body by being transmissively illuminated with light from the light source, the transmissive section arranged at a part including the curved section on the interior component body, wherein the transmissive section is formed by thinning a region of the interior component body,
   the display unit at an area extending from the rear-side face section to the inner-side face section, the display unit not being visible when the light source is kept off.

2. The vehicle interior component according to claim 1, wherein the vehicle body member is a front pillar, and the display unit is arranged at a predetermined range on a lower side of the interior component body in a vehicle top-bottom direction.

* * * * *